Oct. 7, 1924.
J. M. DIEGEL
1,510,587
ELECTRICAL CIRCUIT TRANSMITTER
Filed Dec. 6, 1920    3 Sheets-Sheet 1
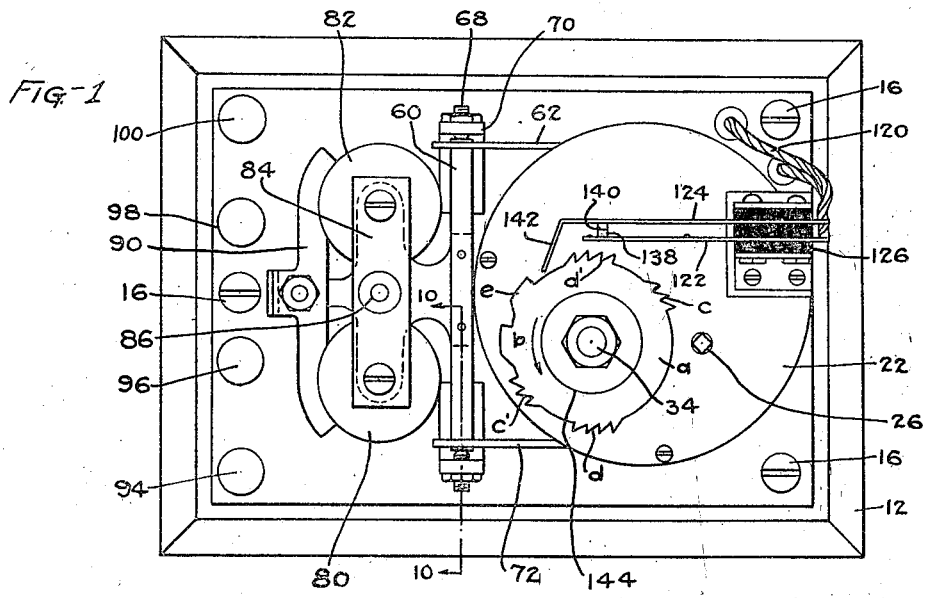
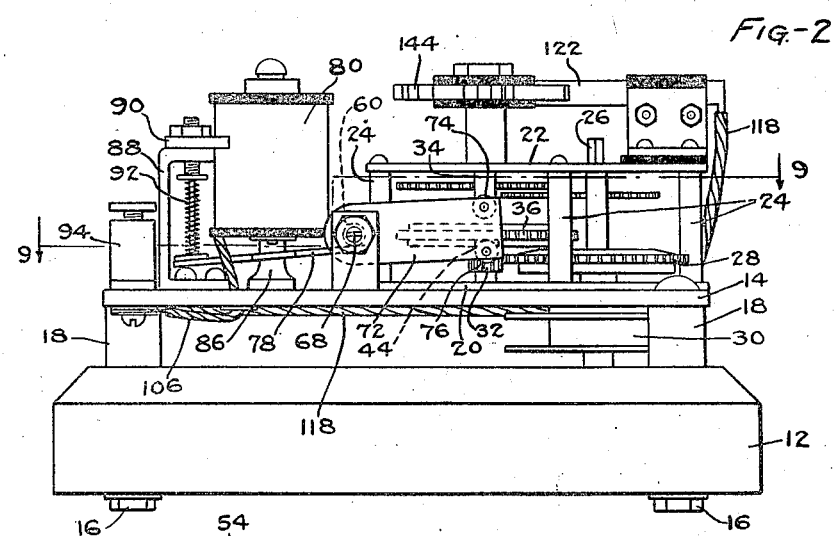
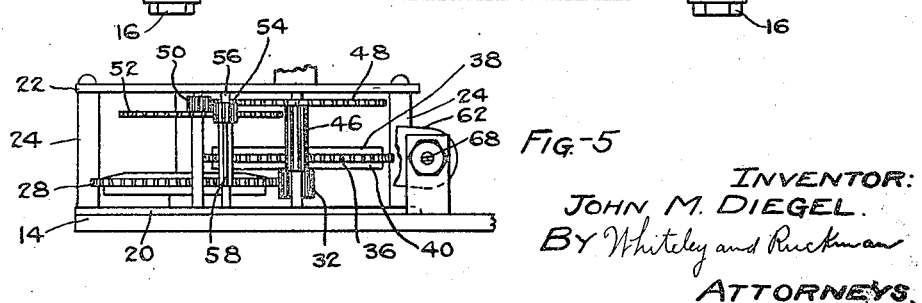
INVENTOR:
JOHN M. DIEGEL.
BY Whiteley and Ruckman
ATTORNEYS.

Oct. 7, 1924.
J. M. DIEGEL
1,510,587
ELECTRICAL CIRCUIT TRANSMITTER
Filed Dec. 6, 1920   3 Sheets-Sheet 2
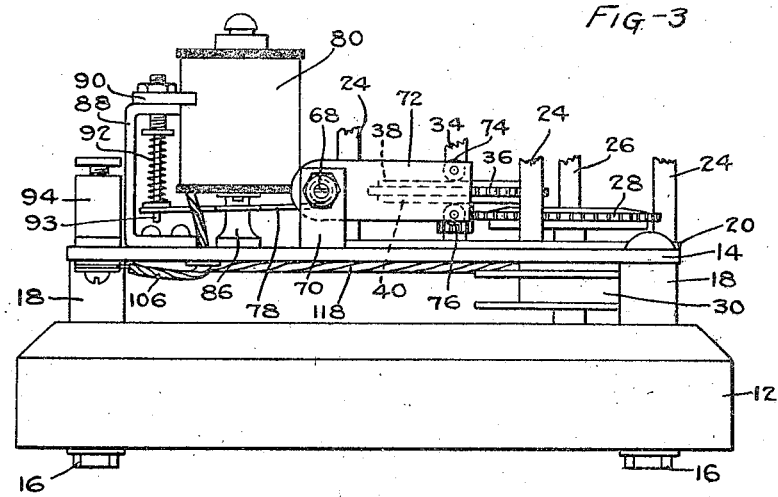
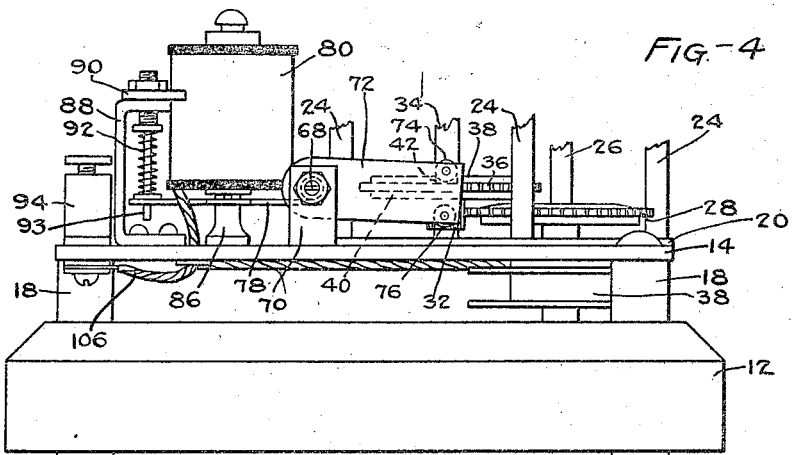
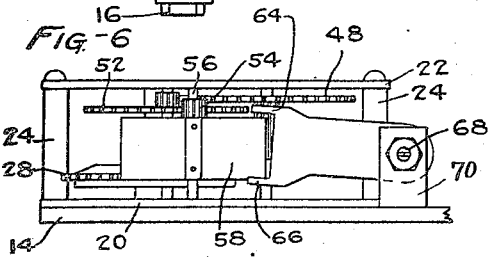
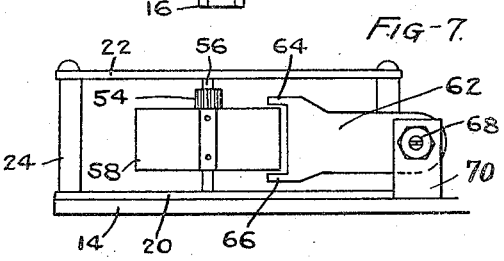
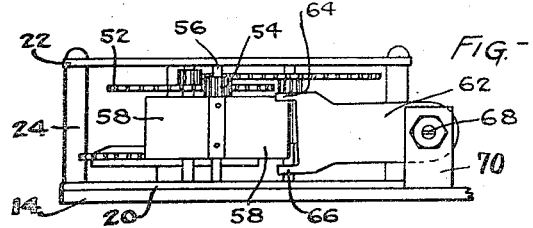
INVENTOR:
JOHN M. DIEGEL.
BY Whiteley and Ruckman
ATTORNEYS.

Oct. 7, 1924.
J. M. DIEGEL
1,510,587
ELECTRICAL CIRCUIT TRANSMITTER
Filed Dec. 6, 1920   3 Sheets-Sheet 3
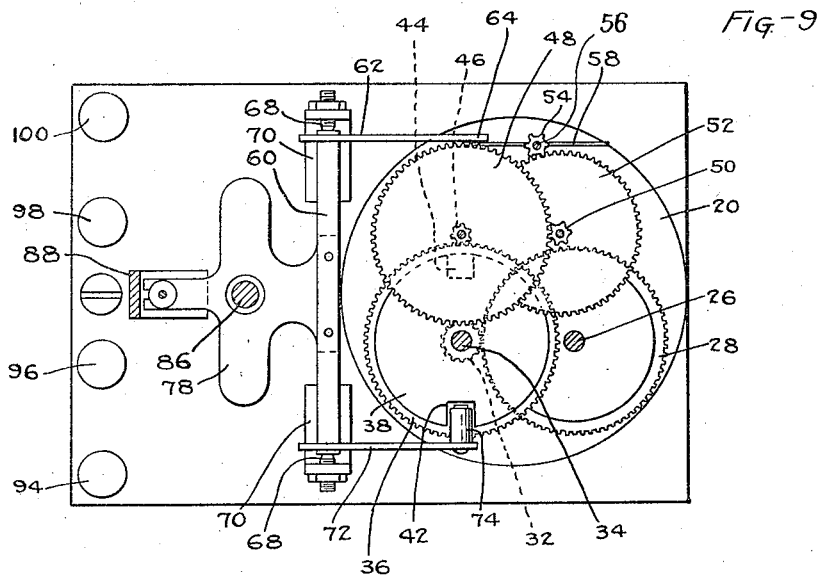
FIG-9
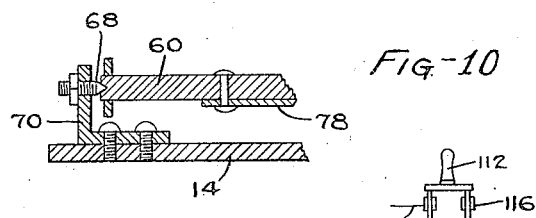
FIG-10
FIG-11
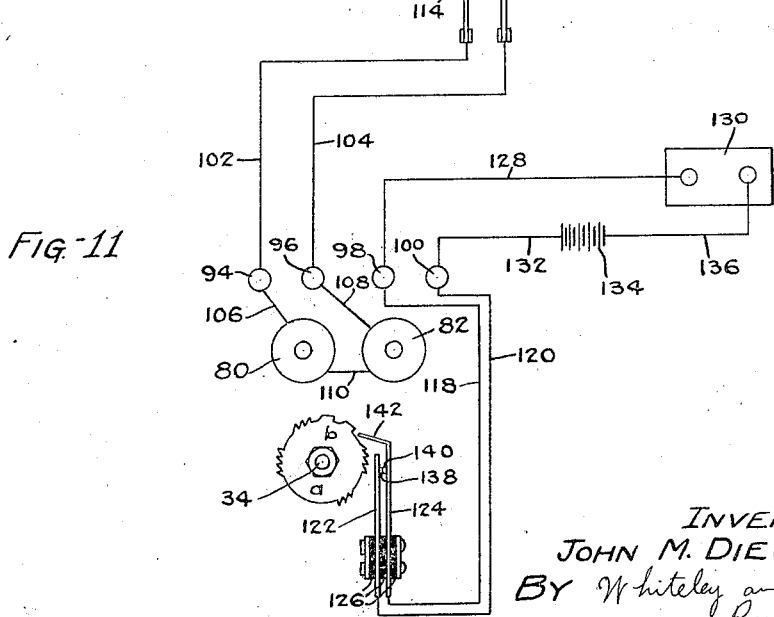
INVENTOR:
JOHN M. DIEGEL.
BY Whiteley and
Ruckman
ATTORNEYS Patented Oct. 7, 1924.

1,510,587

UNITED STATES PATENT OFFICE.

JOHN M. DIEGEL, OF MINNEAPOLIS, MINNESOTA.

ELECTRICAL CIRCUIT TRANSMITTER.

Application filed December 6, 1920. Serial No. 428,699.

*To all whom it may concern:*

Be it known that I, JOHN M. DIEGEL, a citizen of the United States, residing at Minneapolis, in the county of Hennepin and State of Minnesota, have invented certain new and useful Improvements in Electrical Circuit Transmitters, of which the following is a specification.

My invention relates to electrical circuit transmitters and an object is to provide a device which will produce interruptions in a normally-closed electric circuit to operate a signal or recorder when an abnormal condition exists in a system with which the device is connected and also when the system is restored to normal condition. Another object is to provide a device in which the character of the interruptions are in part the same and in part of a different character in the two cases just mentioned.

The full objects and advantages of my invention will appear in connection with the detailed description thereof and the novel features embodied in my inventive idea will be particularly pointed out in the claims.

In the accompanying drawings, which illustrate the application of my invention,—

Fig. 1 is a top plan view of the device. Fig. 2 is a view in side elevation with the electromagnet deenergized. Fig. 3 is a view in side elevation with the electromagnet energized and the device operating to produce interruptions. Fig. 4 is a fragmentary view in side elevation with the electromagnet energized and the device locked in normal position. Fig. 5 is a fragmentary view in side elevation of the opposite side of the apparatus with the stop device partly broken away. Fig. 6 is a view of the stop device in the position which it assumes in Fig. 2. Fig. 7 is a view of the stop device in the position which it assumes in Fig. 3. Fig. 8 is a view of the stop device in the position which it assumes in Fig. 4. Fig. 9 is a view in horizontal section on the line 9—9 of Fig. 2. Fig. 10 is a view in transverse section on the line 10—10 of Fig. 1. Fig. 11 illustrates a wiring diagram.

Referring to the construction shown in the drawings, the numeral 12 designates a base member of non-conducting material to which a metal plate 14 is attached in spaced relation by means of bolts 16 and spacers 18. Mounted on the plate 14 is a clock-work mechanism the wheels of which are partly enclosed between two disks 20 and 22 secured together in spaced relation by screw bolts surrounded by spacers 24 as best shown in Fig. 2, the disk 20 being secured directly upon the plate 14. Rotatably mounted in the disks 20 and 22 is a winding stem 26 upon which is a gear 28 held for forward rotation therewith by the customary pawl, this stem extending below the plate 14 and having a coiled spring 30 attached thereto. The gear 28 meshes with a pinion 32 secured to a shaft 34 to which is also secured a gear 36 having flat surfaces 38 and 40 provided respectively with notches 42 and 44 at diametrically-opposite places circumferentially, as best shown in Fig. 9. The purpose of these notches will be explained later. The gear 36 meshes with a pinion 46 secured to a shaft to which is also secured a gear 48 meshing with a pinion 50 secured to a shaft to which is also secured a gear 52 meshing with a pinion 54 secured to a shaft 56, to which is also secured a wing member 58 extending on both sides of the shaft. Secured to one end of a rock-shaft 60 is a stop blade 62 having lugs 64 and 66 (see Fig. 7) at its top and bottom edges respectively, this rock-shaft being mounted on pointed bearings 68 adjustably supported in brackets 70 attached to the plate 14 as best shown in Figs. 9 and 10. Secured to the end of the rock-shaft 60 opposite from the end to which the blade 62 is secured is an arm 72 carrying rollers 74 and 76 at the upper and lower corners of its free end. The rollers 74 and 76 are adapted to run upon the flat surfaces 38 and 40 respectively. When the rock-shaft 60 is held in the position shown in Fig. 4, which I term the normal position, the roller 74 enters the notch 42 when the latter comes into registering position with the roller, with the result that the stop blade comes into the position shown in Fig. 8 with its free end swung downwardly so that the upper lug 64 is in the path of movement of the wing 58 and prevents the clock mechanism from operating. When the rock-shaft is released and goes into the position shown in Fig. 2 the roller 74 is raised out of the notch 42 and the stop blade is raised into the position shown in Fig. 7, so that the disk having the flat surfaces 38 and 40 and the shaft 34 both make one-half a rotation, whereupon the roller 76 enters the notch 44 and the stop blade 62 moves upwardly into the position shown in Fig. 6 so that the lower lug 66 comes into the path of rotation of the wing 58, thereby stopping the clock mechanism. When the rock-shaft is rocked back towards its original position the roller 76 is depressed out of the notch 44 and the stop blade 62 moves into the position shown in Fig. 7, so that the shaft 34 makes one-half a rotation, whereupon the roller 74 enters the notch 42 and the lug 64 engages the wing 54 and holds the clock mechanism at rest so long as the rock-shaft 60 is held in the position of Fig. 4. In order to hold the rock-shaft in this latter position an armature 78 is secured thereto and this armature is held up to the two coils 80 and 82 of an electromagnet as long as the latter is energized. The coil members 80 and 82 are connected in series and are supported from a crossbar 84 attached to a post 86 which is secured to the plate 14. A bracket 88 attached to the plate 14 is provided at its upper end with a crossbar 90 which engages the coil members 80 and 82 and assists in holding them securely in place. A coil spring 92 interposed between the top of the bracket 82 and a projecting portion of the armature 78 serves to retract the latter when it is not held up by the electromagnet. The spring 92 surrounds a pin 93 having its upper end screw-threaded into the bracket and its lower end extending slidably through the projecting end of the armature. Mounted on the plate 14 and insulated therefrom are four binding posts 94, 96, 98 and 100. By referring to the wiring diagram in Fig. 11, it will be seen that wires 102 and 104 are connected to the posts 94 and 96, which in turn are connected to the electromagnet members 80 and 82 by wires 106 and 108, the members 80 and 82 being connected by a wire 110 while a switch 112 serves to connect the wires 102 and 104 in the circuit of main wires 114 and 116 which supply current from any suitable source of electricity. It will be understood that normally the switch 112 is closed, so that the armature 78 is attracted as shown in Fig. 4. The switch constitutes part of a system which it is not necessary to disclose in this application and which functions in such manner that the switch is opened when an abnormal condition in the system occurs, such as rise or fall in temperature, rise or fall in pressure, unlocked condition of gates and doors, etc. The binding posts 98 and 100 are connected by wires 118 and 120 to spring fingers 122 and 124 held in spaced relation by insulating strips 126 and clamped together. The binding post 98 is connected by a wire 128 to a recorder or a signaling device 130, and the binding post 100 is connected by a wire 132 to a battery 134, which in turn is connected by a wire 136 with the device 130. The fingers 122 and 124 are provided with points 138 and 140 respectively which are normally in contact so that a circuit is completed. The finger 124 has a bent end 142 for co-operation with an interrupter wheel 144 secured upon the upper end of the shaft 34 and insulated therefrom. The interrupter wheel 144 is provided with groups of teeth which engage the bent end of the finger 124 when the wheel 144 is permitted to rotate, thereby breaking the circuit repeatedly on account of the separation of the contact points 138 and 140. The interrupter wheel 144 may be considered as consisting of two halves, designated $a$ and $b$, the half $a$ having two groups of teeth $c$ and $d$ corresponding to two groups of teeth $c'$ and $d'$ on the half $b$, the latter also having one or more teeth $e$ of a different character.

The operation and advantages of my invention will be readily understood from the foregoing description. When the switch 112 is opened by any of the abnormal conditions previously mentioned the armature 78 is released and the interrupter wheel makes a half rotation and is stopped. This carries the half marked $a$ past the finger end 142 with the result that the current is repeatedly broken in accordance with the number and position of the teeth $c$ and $d$ and these interruptions are made manifest in any suitable manner, as by the device 130. When the system becomes normal and the switch 112 is again closed, the wheel 144 makes another half rotation and is stopped. This carries the half marked $b$ past the finger end 142 and with the construction illustrated the teeth $c'$ and $d'$ will give the same interruptions as before with additional interruptions produced by the teeth $e$, these latter indicating that the system is again in normal condition. It will be understood that the number of teeth on the interrupter wheel may be varied as desired in order to obtain different signals from different transmitters.

I claim:

1. An electrical circuit transmitter comprising an electromagnet, an armature for said electromagnet, a clockwork mechanism, a stop member secured to a shaft of said clock mechanism, a rockshaft to which said armature is secured, a stop member secured to one end of said rock-shaft, two stop elements on the free end of said last-mentioned stop member, one of said elements being adapted to come into the path of rotation of said first-mentioned stop member when said armature is attracted by said electromagnet, and the other of said stop elements being adapted to come into the path of rotation of said first-mentioned stop member when said armature is unattracted, a disk secured to a shaft of said clock mechanism, said disk having a notch in each of its two faces, these notches being located at diametrically-opposite points, an arm secured to the other end of said rock-shaft, two spaced members carried by the free end of said arm, said spaced members being adapted to ride upon the two surfaces respectively of said disk and to enter said notches, an interrupter wheel secured to a shaft of said clock mechanism, similar interrupter means on the two halves of said wheel, additional interrupter means on one of said halves, and two contact-carrying members insulated from each other and normally having their contacts engaging each other, one of said members being adapted for engagement by said interrupter wheel to separate said contacts.

2. An electrical circuit transmitter comprising an electromagnet, an armature for said electromagnet, a clockwork mechanism, a wing secured to and extending from opposite sides of a shaft of said clock mechanism, a rock-shaft to which said armature is secured, a stop blade secured to one end of said rock-shaft, two lugs on the free end of said stop blade, one of said lugs being adapted to come into the path of rotation of said wing when said armature is attracted by said electromagnet, and the other of said lugs being adapted to come into the path of rotation of said wing when said armature is unattracted, a disk secured to a shaft of said clock mechanism, said disk having a notch in each of its opposite surfaces, these notches being located at diametrically-opposite points, an arm secured to the other end of said rock-shaft, two spaced rollers carried by the free end of said arm, said rollers being adapted to ride upon the two surfaces respectively of said disk and to enter said notches, an interrupter wheel secured to said last-mentioned clock shaft, similar interrupter teeth on the two halves of said wheel, additional interrupter means on one of said halves, and two spring fingers insulated from each other and having contact points normally in engagement, one of said fingers being adapted for engagement by said interrupter wheel to separate said contact points.

In testimony whereof I hereunto affix my signature.

JOHN M. DIEGEL.